United States Patent
Fornara et al.

(10) Patent No.: US 7,856,957 B2
(45) Date of Patent: Dec. 28, 2010

(54) INTAKE MANIFOLD WITH A SWIRL SYSTEM FOR AN INTERNAL COMBUSTION ENGINE

(75) Inventors: Stefano Fornara, Modena (IT); Giampaolo Schiavina, Bologna (IT)

(73) Assignee: Magneti Marelli S.p.A. (IT)

( * ) Notice: Subject to any disclaimer, the term of this patent is extended or adjusted under 35 U.S.C. 154(b) by 0 days.

(21) Appl. No.: 12/508,624

(22) Filed: Jul. 24, 2009

(65) Prior Publication Data

US 2010/0018496 A1    Jan. 28, 2010

(30) Foreign Application Priority Data

Jul. 24, 2008    (EP)    ................... 08425500

(51) Int. Cl.
*F02B 31/00* (2006.01)
*F02M 35/10* (2006.01)
(52) U.S. Cl. .................... 123/306; 123/184.53
(58) Field of Classification Search ........... 123/301, 123/302, 306, 308, 336, 337, 399, 432, 442, 123/184.21, 184.27, 184.53, 184.55; 251/286, 251/288, 305
See application file for complete search history.

(56) References Cited

U.S. PATENT DOCUMENTS

| | | | | |
|---|---|---|---|---|
| 3,885,003 A * | 5/1975 | Kobayashi et al. | ........ | 261/23.2 |
| 4,359,997 A * | 11/1982 | Lyssy | ........ | 123/592 |
| 4,445,473 A * | 5/1984 | Matsumoto | ........ | 123/308 |
| 4,479,469 A * | 10/1984 | Namba et al. | ........ | 123/308 |
| 4,519,350 A * | 5/1985 | Oda et al. | ........ | 123/308 |
| 4,545,347 A * | 10/1985 | Morikawa | ........ | 123/308 |
| 4,930,468 A * | 6/1990 | Stockhausen | ........ | 123/188.14 |
| 5,186,139 A * | 2/1993 | Matsura | ........ | 123/301 |
| 5,201,291 A * | 4/1993 | Katoh et al. | ........ | 123/399 |
| 5,255,654 A * | 10/1993 | Karlsson | ........ | 123/403 |
| 6,164,623 A * | 12/2000 | Ito et al. | ........ | 251/305 |
| 6,209,501 B1 * | 4/2001 | Kaneko | ........ | 123/184.21 |
| 6,293,247 B1 * | 9/2001 | Sasaki et al. | ........ | 123/308 |
| 6,321,718 B1 * | 11/2001 | Mangold et al. | ........ | 123/336 |
| 6,371,080 B1 * | 4/2002 | Saito et al. | ........ | 123/337 |

(Continued)

FOREIGN PATENT DOCUMENTS

EP    1 085 197    3/2001

(Continued)

OTHER PUBLICATIONS

European Search Report mailed Jan. 14, 2009 in corresponding European Application No. 08425500.9.

*Primary Examiner*—Stephen K Cronin
*Assistant Examiner*—Johnny H Hoang
(74) *Attorney, Agent, or Firm*—Ostrolenk Faber LLP

(57) ABSTRACT

An intake manifold with a swirl system for an internal combustion engine provided with a number of cylinders; the intake manifold has, for each cylinder, an intake pipe, which is adapted to connect the intake manifold to the cylinder and has, in turn, two reciprocally parallel channels; the swirl system is provided with: for each intake pipe, a choking valve, which is arranged inside a channel of the intake pipe and is adapted to vary the air introduction section through the channel; and a single actuator device, which simultaneously and synchronically displaces all the choking valves and is provided with a motor and a mechanical transmission system which transmits the motion from the motor to all the choking valves.

13 Claims, 4 Drawing Sheets

U.S. PATENT DOCUMENTS

| | | | |
|---|---|---|---|
| 6,568,366 B2 * | 5/2003 | Dietz et al. | 123/308 |
| 6,782,872 B2 * | 8/2004 | Moschini et al. | 123/470 |
| 7,089,909 B2 * | 8/2006 | Moschini et al. | 123/306 |
| 7,249,585 B2 * | 7/2007 | Fornara et al. | 123/308 |
| 7,392,826 B2 * | 7/2008 | Schub et al. | 137/601.17 |
| 2008/0127929 A1 * | 6/2008 | Lancioni et al. | 123/184.56 |

FOREIGN PATENT DOCUMENTS

| | | |
|---|---|---|
| JP | 60-147534 | 8/1985 |
| WO | WO 98/42969 | 10/1998 |
| WO | WO 00/08320 | 2/2000 |
| WO | WO 01/14701 | 3/2001 |

* cited by examiner

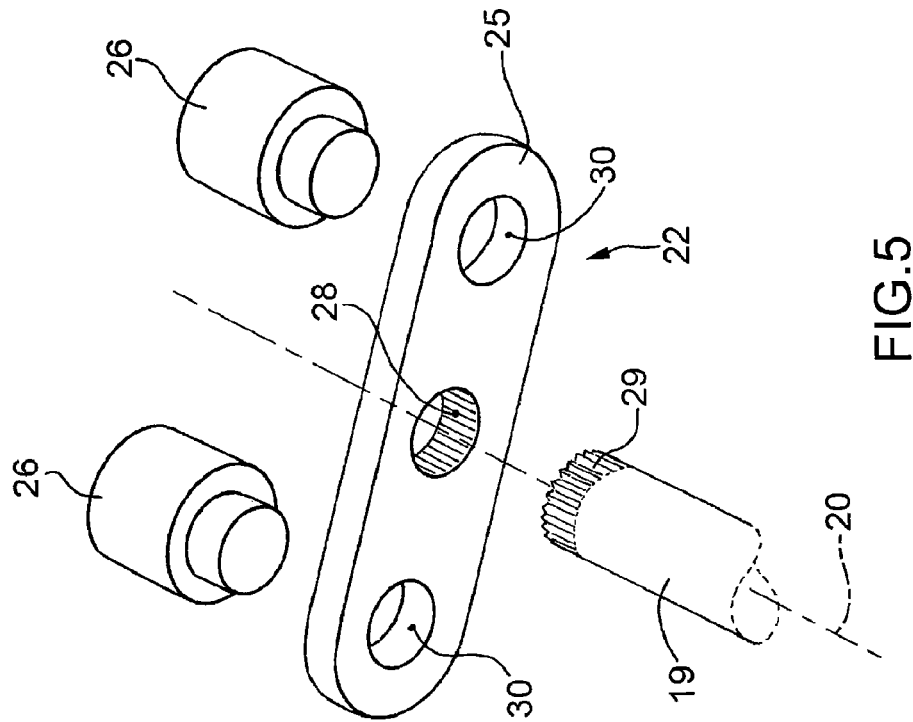
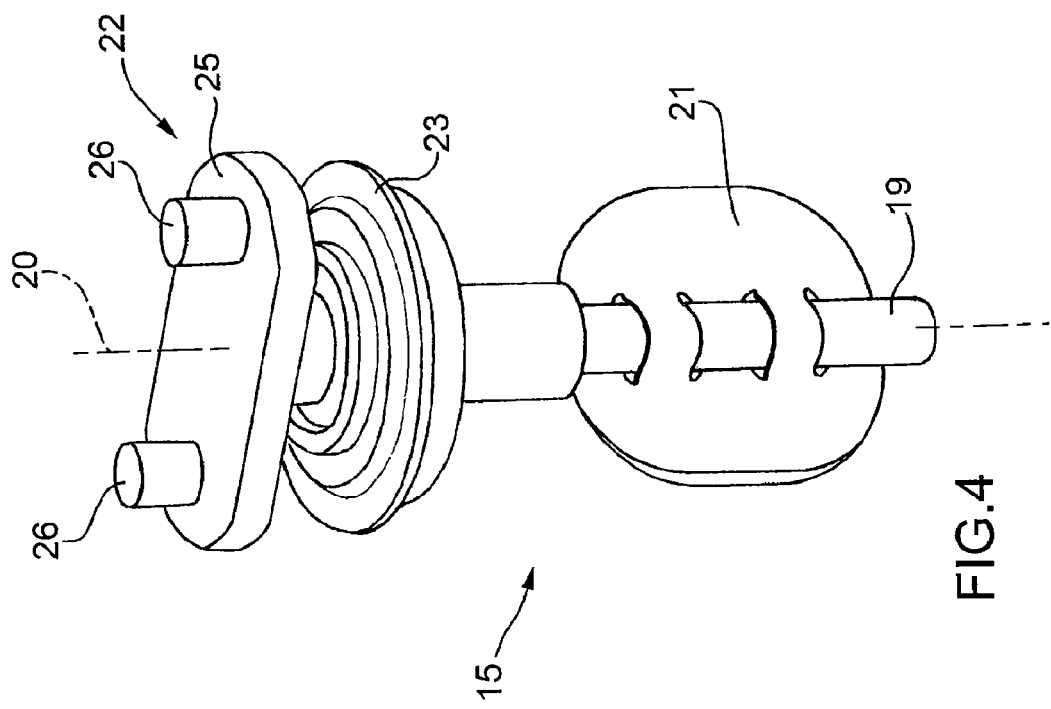
FIG.5
FIG.4

INTAKE MANIFOLD WITH A SWIRL SYSTEM FOR AN INTERNAL COMBUSTION ENGINE

TECHNICAL FIELD

The present invention relates to an intake manifold with a swirl system for an internal combustion engine.

BACKGROUND ART

An internal combustion engine is provided with a number of cylinders, each of which is connected to an intake manifold by means of at least one intake valve and to an exhaust manifold by means of at least one exhaust valve. The intake manifold receives fresh air (i.e. air from the external environment) through a feeding pipe adjusted by a butterfly valve and is connected to the cylinders by means of corresponding intake pipes, each of which is adjusted by at least one intake valve.

The introduction of a swirl system, which is adapted to vary the section of the intake pipes during the engine operation according to the speed of the engine itself (i.e. to the angular rotation speed of the drive shaft), has recently been suggested. At low speeds, the air introduction section through the intake pipes is decreased so as to generate turbulences in the aspirated air flow which improve the air and fuel mixing in the cylinders; in virtue of the presence of these turbulences which improve mixing, all the injected fuel is burnt and thus the polluting emissions generated by the combustion are reduced. At high speeds, the air introduction section through the intake pipes is maximized so as to allow a complete filling of the cylinders, and thus to allow the generation of the maximum possible power.

In order to vary the air introduction section through the intake pipes, each intake pipe has two reciprocally parallel channels, only one of which may be completely closed by a butterfly choking valve. At low speeds, the butterfly choking valves are closed, therefore reducing the air introduction section through the intake pipes, while at high speeds the butterfly choking valves are opened to maximize the air introduction section through the intake pipes.

In the currently marketed engines, it has been suggested to use a single common actuator device, which simultaneously and synchronically actuates all the choking valves; specifically, the actuator device comprises a stiff bar, which is mechanically connected to all the choking valves so as to simultaneously and synchronically actuate all the choking valve themselves, and an electric motor, which is mechanically connected to the bar to control the displacement of the bar between two limit positions corresponding to the closing and maximum opening positions of the choking valves. The two limit positions of the bar corresponding to the closing and maximum opening positions of the choking valves and are defined by two mechanical stroke ends which are mechanically coupled to the electric motor. The actuator device further comprises a position sensor, which is coupled to the electric motor and indirectly detects the position of the bar to allow a feedback control of the electric motor itself; furthermore, the position sensor is also used to check the actual operation of the actuator device and thus indicate a possible malfunctioning of the actuator device itself according to the indications of OBD2 (On Board Diagnose 2) standards. Indeed, a malfunctioning of the actuator device compromises the correct operation of the swirl system, and may thus determine an increase of polluting emissions generated by combustion, particularly at low speeds.

However, according to the specifications defined by the United States CARB (California Air Resources Board), checking the operation of the above-described swirl system is not sufficient, because it allows to only check that the electric motor is operating on the bar but does not check if the bar is correctly transmitting motion to all the choking valves; in other words, the check of the operation of the above-described swirl system is not able to diagnose the breakdown of the mechanical connection between a single choking valve and the bar. Therefore, the above-described swirl system does not meet the approval requirements established by CARB and thus may not be approved in the United States.

In order to comply with the approval requirements established by CARB, it has been suggested to couple a position sensor to each choking valve; however, this solution is expensive both for the cost related to the position sensors and for the cost related to the mechanical assembly and to the wiring of the position sensor themselves.

DISCLOSURE OF INVENTION

It is the object of the present invention to manufacture an intake manifold with a swirl system for an internal combustion engine, which intake manifold is free from the above-described drawbacks, is easy and cost-effective to be manufactured and complies with the approval requirements established by CARB.

According to the present invention, an intake manifold with a swirl system for an internal combustion engine is made as claimed in the appended claims.

BRIEF DESCRIPTION OF THE DRAWINGS

The present invention will now be described with reference to the accompanying drawings, which show a non-limitative embodiment thereof, in which:

FIG. 4 is a perspective view of a choking valve in FIG. 3; and

FIG. 5 is an exploded perspective view of a detail of the choking valve in FIG. 4.

PREFERRED EMBODIMENTS OF THE INVENTION

Figure 1:
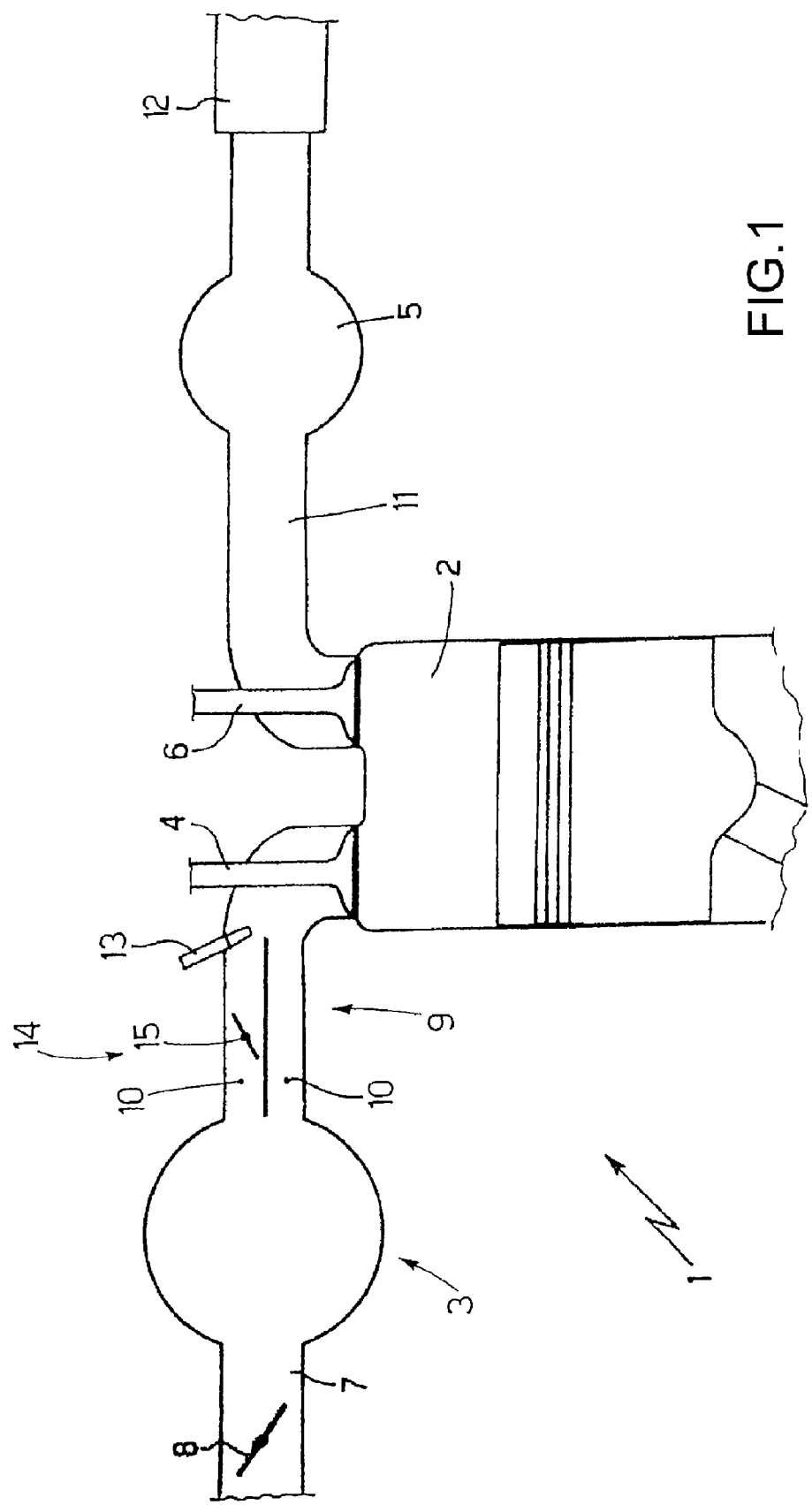
FIG. 1 is a diagrammatic view of an internal combustion engine provided with an intake manifold made according to the present invention.

In FIG. 1, numeral 1 indicates as a whole an internal combustion engine provided with four cylinders 2 (only one of which is shown in FIG. 1), each of which is connected to an intake manifold 3 by means of two intake valves 4 (only one of which is shown in FIG. 1) and to an exhaust manifold 5 by means of two exhaust valves 6 (only one of which is shown in FIG. 1).

The intake manifold 3 receives fresh air (i.e. air from the external environment) through a feeding pipe 7 adjusted by a butterfly valve 8 and is connected to the cylinders 2 by means of corresponding intake pipes 9 (only one of which is shown in FIG. 1), each of which comprises two reciprocally parallel channels 10 and is adjusted by corresponding intake valves 4. Similarly, the exhaust manifold 5 is connected to the cylinders 2 by means of corresponding exhaust pipes 11 (only one of which is shown in FIG. 1), each of which is adjusted by corresponding exhaust valves 6; an emission pipe 12, which ends with a muffler (known and not shown) to release the gases produced by combustion into the atmosphere, departs from exhaust manifold 5.

According to a preferred embodiment, the fuel (e.g. petrol, diesel, methane or LPG) is injected into each intake pipe 9 by means of a corresponding injector 13 arranged close to the corresponding intake valves 4. According to a different embodiment (not shown), the injectors 13 are arranged so as to directly inject the fuel into each cylinder 2.

The intake manifold 3 comprises a choking system 14 of the swirl type, which is adapted to vary the section of the intake pipes 9 during the operation of the internal combustion engine 1 according to the speed of internal combustion engine 1 itself. Specifically, the choking system 14 of the swirl type comprises, for each intake pipe 9, a choking valve 15, which is mounted along one of the two channels 10 of the intake pipe 9 and is adapted to vary the air introduction section through the channel 10 itself; specifically, each choking valve 15 is movable between a closing position, in which it fully closes the channel 10, and a maximum opening position.

Figure 2:
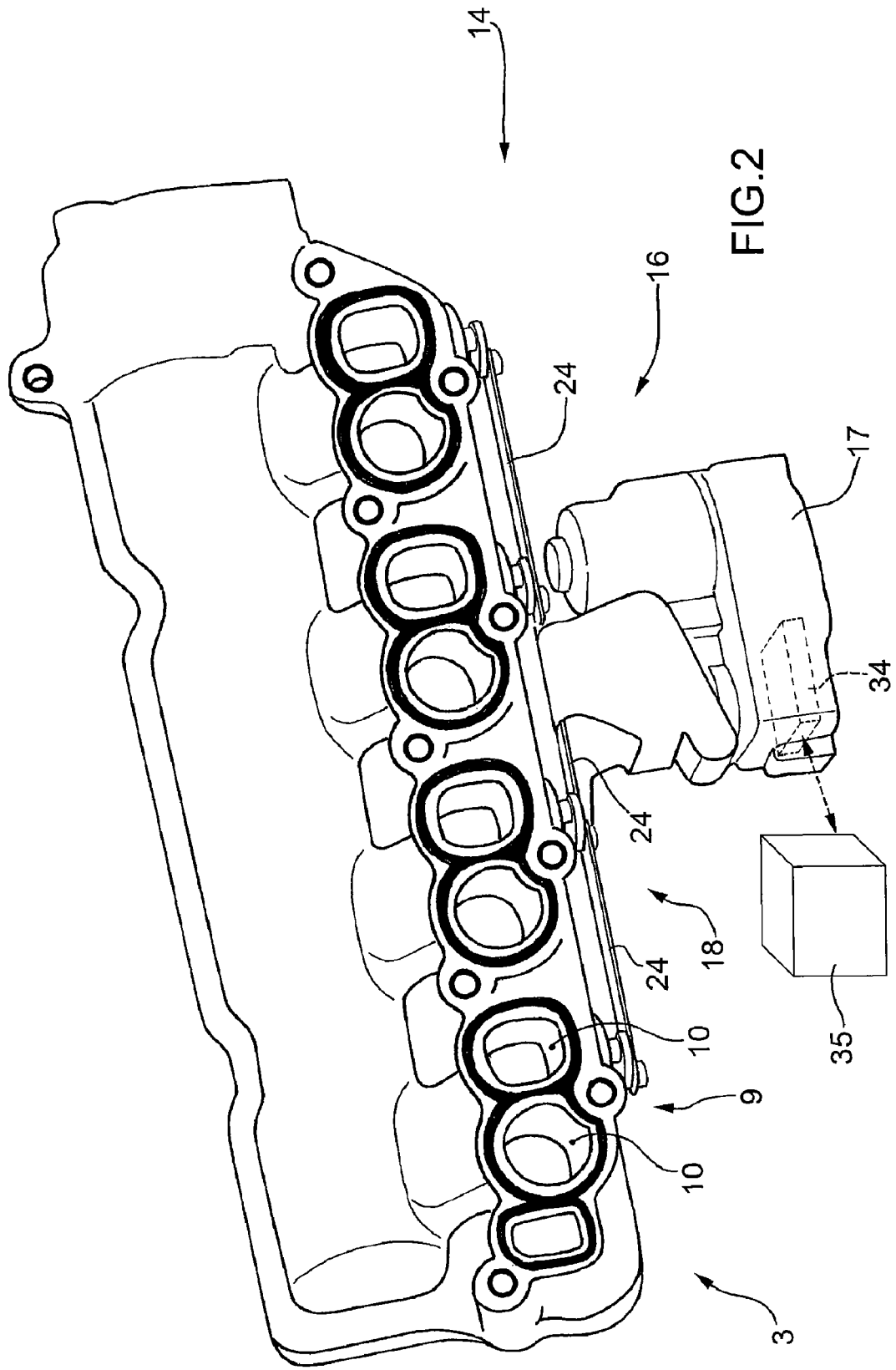
FIG. 2 is a diagrammatic perspective view of the intake manifold in FIG. 1.

As shown in FIG. 2, the choking system 14 of the swirl type comprises a single actuator device 16 of the electric or pneumatic type, which simultaneously and synchronically displaces all four choking valves 15. The actuator device 16 comprises an electric motor 17 (according to a different embodiment not shown, the motor 17 is pneumatic or hydraulic) and a mechanical transmission system 18 which transmits the motion from the motor 17 to all the choking valves.

As shown in FIG. 4, each choking valve 15 comprises a shaft 19, which is pivotally mounted to rotate about a central rotation axis 20, under the bias of the actuator 16, and has a butterfly valve 21, which is adapted to close a channel 10 of a corresponding intake pipe 9; in the embodiment shown in the accompanying figures, the butterfly valve 21 is mounted to the shaft 19 while, according to a different embodiment (not shown), the butterfly valve 21 could be integrated on the shaft 19. Furthermore, each choking valve 15 comprises an actuating lever 22 which is angularly integral with the shaft 19, is arranged outside the intake pipe 9, is angularly integral with the shaft 19 and is part of the mechanical transmission system 18. Finally, each choking valve 15 comprises a fastening flange 23, which is fitted onto the shaft 19 so as to be able to rotate with respect to the shaft 19 itself, is made integral with a wall of the intake manifold 3, and serves the function of keeping the shaft 19 in position.

Figure 3:
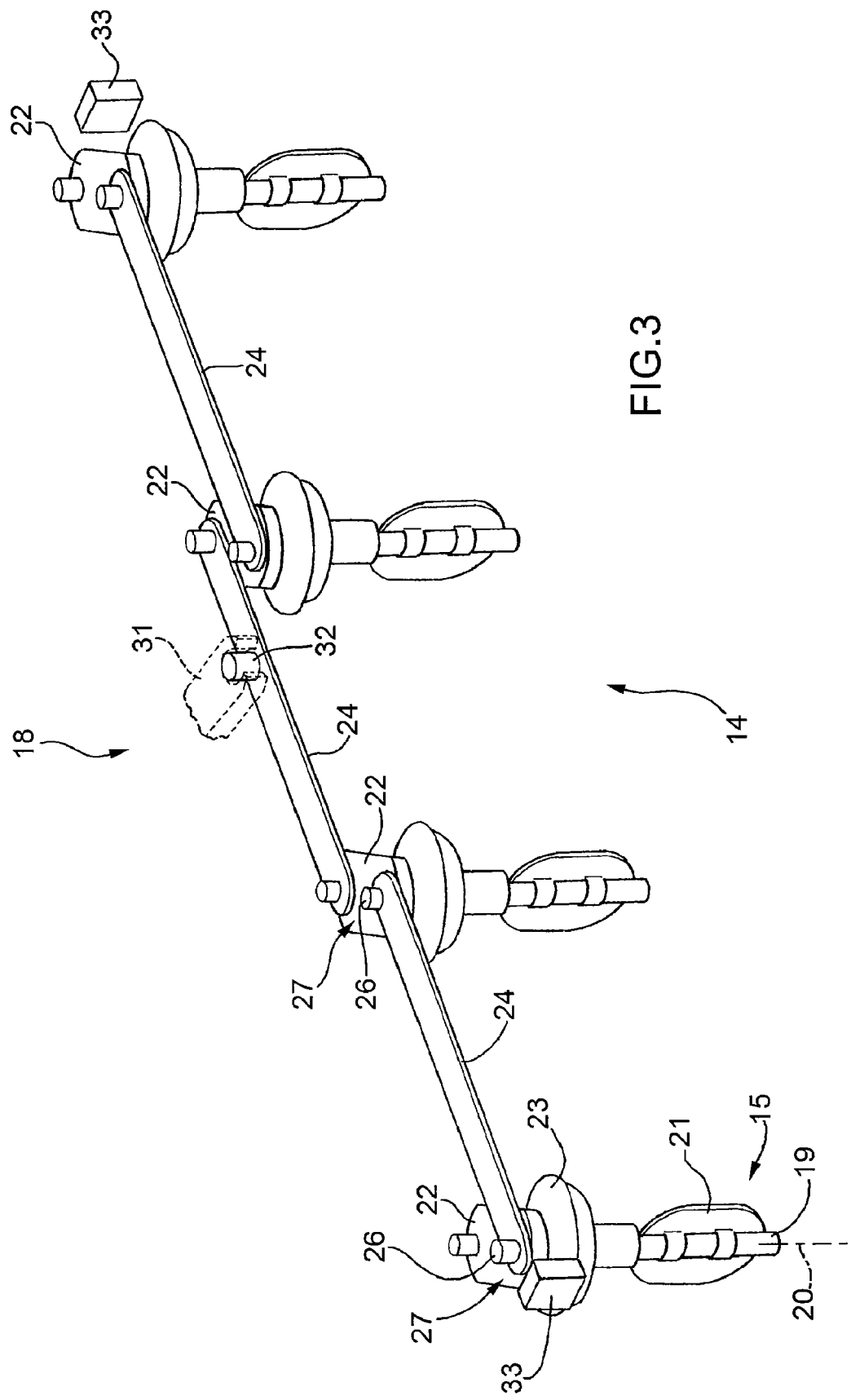
FIG. 3 is a perspective view of a set of choking valves of the intake manifold in FIG. 2.

As shown in FIG. 3, the mechanical transmission system 18 comprises three stiff connecting rods 24 which are reciprocally independent and separated, and each of which reciprocally connects two actuating levers 22 of two adjacent choking valves 15. As shown in FIG. 4, the actuating lever 22 of each choking valve 15 has a plate 25 arranged perpendicularly to the rotation axis 20 and fitted onto the shaft 19 and a pair of pins 26, which are parallel to the rotation axis 20 and are arranged symmetrically and eccentrically on opposite sides of the rotation axis 20 itself. As shown in FIG. 3, each connecting rod 24 has two opposite ends hinged to two corresponding pins 26 of two different adjacent choking valves 15; specifically, each connecting rod 24 has two through holes 27, which are arranged at the opposite ends of the connecting rod 24 and receive the corresponding pins 26 of two different adjacent choking valves 15.

As shown in FIG. 5, each plate 25 has a central hole 29 having a toothing and each shaft 19 has an end 29 which is inserted into the central hole 29 of the plate 25 and has a toothing which meshes with the toothing of the central hole 29; preferably, the end 29 of the shaft 19 is welded to the plate 25 once it has been inserted into the central hole 29 of the plate 25. Furthermore, each plate 25 has two side holes 30, which are arranged on opposite sides of the central hole 29 and which receive the two pins 26; preferably, the two pins 26 are welded to the plate 25 once they have been inserted into the corresponding side holes 30.

As shown in FIG. 2, the motor 17 is mechanically connected to a central connecting rod 24 of the mechanical transmission system 18; specifically, as shown in FIG. 3, the actuator device 16 comprises a fork-like connecting element, which is fitted onto a shaft of the motor 17 on one side and is coupled to a pin 32 of the central connecting rod 24 on the other side, so as to be able to freely rotate with respect to the pin 32 itself.

As shown in FIG. 3, the mechanical transmission system comprises two stroke ends 33 which are arranged at opposite ends of the mechanical transmission system 18 and define the respective limit positions, corresponding to the closing and maximum opening positions of the choking valves 15. In other words, the two stroke ends 33 are mechanically coupled to (i.e. mechanically interact with) the actuating levers 22 of the two choking valves 15 arranged at the opposite ends of the mechanical transmission system 18. Furthermore, as shown in FIG. 2, the actuator device 16 comprises a position sensor 34, which is adapted to either directly or indirectly detect the position of the mechanical transmission system 18; in other words, the position sensor 34 may be mechanically connected to the mechanical transmission system 18 (e.g. to the central connecting rod 24) or may be mechanically connected to the shaft of the motor 17 (or to another movable part of the motor 17) which is mechanically coupled to the mechanical transmission system 18. Finally, the actuator device 16 comprises a control unit 35, which drives the motor 17 to displace the mechanical transmission system 18 (i.e. the connecting rods 24 of the mechanical transmission system 18) from a first limit position against a corresponding first stroke end 33 to a second limit position against a corresponding stroke end 33 opposite to the first stroke end 33. The control unit 35 uses the position signal supplied by the position sensor 34 for feedback driving the motor 17; furthermore, the control unit 35 checks whether the movable part of the motor 17 performs a larger displacement than the displacement allowed by the presence of the stroke ends 33 and signals a malfunctioning if the movable part of the motor 17 performs a larger displacement than the displacement allowed by the presence of the stroke ends 33.

In other words, the control unit 35 drives the motor 17 to make the mechanical transmission system 18 (i.e. the connecting rods 24 of the mechanical transmission system 18) perform a larger displacement than the displacement allowed by the presence of the stroke ends 33 so as to lead the mechanical transmission system (i.e. the connecting rods 24 of the mechanical transmission system 18) constantly in abutment against the stroke ends 33. If a breakdown occurs in the mechanical transmission system 18 (e.g. if a connecting rod 24 or an actuating lever 22 no longer transmits motion), then the mechanical transmission system 18 will no longer come into contact with one of the two stroke ends 33 (which are appropriately arranged at opposite ends of the mechanical transmission system 18); thus, if the control unit 35 checks that the movable part of the motor 17 performs a larger displacement than the displacement allowed by the presence of the stroke ends 33, then it diagnoses that a failure to the mechanical transmission system 18 has occurred.

The above-described choking system 14 of the swirl type has many advantages, because it is simple and cost-effective to be manufactured and quick to be assembled; specifically, the above-described choking system 14 of the swirl type has a single position sensor (the position sensor 34) coupled with the mechanical transmission system 18. Furthermore, in the above-described choking system 14 of the swirl type, it is constantly checked whether the mechanical transmission system 18 is working properly, i.e. is transmitting the motion to all the choking valves 15, as required by the approval requirements established by CARB.

The invention claimed is:

1. An intake manifold (3) with a swirl system (14) for an internal combustion engine (1) provided with a number of cylinders (2); the intake manifold (3) comprises, for each cylinder (2), an intake pipe (9), which is adapted to connect the intake manifold (3) to the cylinder (2) and comprises, in turn, two reciprocally parallel channels (10); the swirl system (14) comprises:

for each intake pipe (9), a choking valve (15), which is arranged inside a channel (10) of the intake pipe (9) and is adapted to vary the air introduction section through the channel (10); and a single actuator device (16), which simultaneously and synchronically displaces all the choking valves (15) and is provided with a motor (17) and with a mechanical transmission system (18) which transmits the motion from the motor (17) to all the chocking valves (15);

the intake manifold (3) is characterized in that:

each choking valve (15) comprises an actuating lever (22) angularly integral with a pivotally mounted shaft (19) of the choking valve (15) itself;

the mechanical transmission system (18) comprises a number of stiff connecting rods (24) which are reciprocally independent and separated, each of which reciprocally connects two actuating levers (22) of two adjacent choking valves (15); and the mechanical transmission system (18) comprises two stroke ends (33) which are arranged at opposite ends of the mechanical transmission system (18) and define the respective limit positions corresponding to the closing and maximum opening positions of the choking valves (15).

2. An intake manifold (3) according to claim 1, wherein the two stroke ends (33) are mechanically coupled to the actuating levers (22) of the two choking valves (15) arranged at the opposite ends of the mechanical transmission system (18).

3. An intake manifold (3) according to claim 1, wherein the actuator device (16) comprises a position sensor (34), which is adapted to either directly or indirectly detect the position of the movable part of the motor (17).

4. An intake manifold (3) according to claim 3, wherein the actuator device (16) comprises a control unit (35), which drives the motor (17) to displace the mechanical transmission system (18) from a first limit position against a corresponding first stroke end (33) to a second limit position against a corresponding second stroke end (33) opposite to the first stroke end (33); the control unit (35) is connected to the position sensor (34) to check if the mechanical transmission system (18) performs a larger displacement than the displacement allowed by the presence of the stroke ends (33) and to indicate a malfunctioning if the mechanical transmission system (18) performs a larger displacement than the displacement allowed by the presence of the stroke ends (33).

5. An intake manifold (3) according to claim 1, wherein the motor (17) is mechanically connected to a central connecting rod (24) of the mechanical transmission system (18).

6. An intake manifold (3) according to claim 5, wherein the actuator device (16) comprises a fork-like connecting element (31), which is fitted onto a shaft of the motor (17) on one side and is coupled to a pin (32) of the central connection rod (24) on the other side, so as to be able to freely rotate with respect to the first pin (32) itself.

7. An intake manifold (3) according to claim 1, wherein the actuating lever (22) of each choking valve (15) has a plate (25) arranged perpendicularly to the rotation axis (20) and fitted onto the shaft (19) and a pair of second pins (26), which are parallel to the rotation axis (20) and are eccentrically arranged on opposite sides of the rotation axis (20) itself; each connecting rod (24) has two opposite ends hinged to two corresponding second pins (26) of two different adjacent choking valves (15).

8. An intake manifold (3) according to claim 7, wherein each connecting rod (24) has two through holes (27), which are arranged at the opposite ends of the connecting rod (24) and receive the corresponding second pins (26) of two different adjacent choking valves (15).

9. An intake manifold (3) according to claim 7, wherein each plate (25) has a central hole (29) having a toothing; each shaft (19) has an end (29) which is inserted into the central hole (29) of the plate (25) and has a toothing which meshes with the toothing of the central hole (29).

10. An intake manifold (3) according to claim 9, wherein the end (29) of the shaft (19) is welded to the plate (25) once it has been inserted into the central hole (29) of the plate (25).

11. An intake manifold (3) according to claim 9, wherein each plate (25) has two side holes (30), which are arranged on the opposite sides of the central hole (29) and receive the two second pins (26).

12. An intake manifold (3) according to claim 11, wherein two second pins (26) are welded to the plate (25) once they have been inserted into the corresponding side holes (30).

13. An intake manifold (3) according to claim 1, wherein each choking valve (15) comprises:

the shaft (19), which is pivotally mounted to rotate about a central rotation axis (20) under the bias of the actuator device (16) and has a butterfly valve (21) which is adapted to close a channel (10) of a corresponding intake pipe (9);

the actuating lever (22) which is angularly integral with the shaft (19); and a fastening flange (23), which is fitted onto the shaft (19) so as to be able to rotate with respect to the shaft (19) itself and is made integral with a wall of the intake manifold (3).

* * * * *